(12) United States Patent
Huang et al.

(10) Patent No.: US 8,773,440 B2
(45) Date of Patent: Jul. 8, 2014

(54) METHOD AND DEVICE FOR SIMPLIFYING A COMPLEX PATH

(75) Inventors: Genglin Huang, Beijing (CN); Hao Lin, Beijing (CN); Yu Tang, Beijing (CN)

(73) Assignees: Peking University Founder Group Co., Ltd, Beijing (CN); Beijing Founder Electronics Co., Ltd, Beijing (CN)

( * ) Notice: Subject to any disclaimer, the term of this patent is extended or adjusted under 35 U.S.C. 154(b) by 620 days.

(21) Appl. No.: 13/121,237

(22) PCT Filed: Sep. 28, 2009

(86) PCT No.: PCT/CN2009/074292
§ 371 (c)(1),
(2), (4) Date: Jun. 15, 2011

(87) PCT Pub. No.: WO2010/034267
PCT Pub. Date: Apr. 1, 2010

(65) Prior Publication Data
US 2011/0242109 A1  Oct. 6, 2011

(30) Foreign Application Priority Data

Sep. 28, 2008  (CN) .......................... 2008 1 0223289

(51) Int. Cl.
*G06T 11/20*  (2006.01)
(52) U.S. Cl.
USPC ........................................................ 345/443
(58) Field of Classification Search
USPC ........................................................ 345/443
See application file for complete search history.

(56) References Cited

U.S. PATENT DOCUMENTS 5,129,051 A * 7/1992 Cain ............................. 345/423
5,179,645 A * 1/1993 Tanimori ..................... 345/441

(Continued)

FOREIGN PATENT DOCUMENTS

CN     1549207 A    11/2004
CN   101499082 A     8/2009

OTHER PUBLICATIONS

Wei, Xu-qing, "An Algorithm for Evaluating the Area of the Overlap or the Union of Polygons," Computer Engineering & Science, vol. 29, No. 12, Dec. 29, 2007, pp. 85-86.
ISR for PCT/CN2009/074292 dated Jan. 7, 2010.

*Primary Examiner* — Ryan R Yang
(74) *Attorney, Agent, or Firm* — Lowe Hauptman & Ham, LLP

(57) ABSTRACT

The invention relates to a technical field of graphic image processing, especially to a technology for simplifying a complex path. The invention provides a method and a device for simplifying a complex path, to accomplish simplification of any complex path into a simple path of a region described by the complex path. The method for simplifying a complex path comprises: parsing the complex path into a vector linked-list consisted of linked monotonic vectors; dividing each vector in the vector linked-list into vector segments according to intersection points of the vector with other vectors in the vector linked-list; and extracting from all vector segments the vector segments located on a boundary of a region defined by the complex path, and connecting the extracted vector segments according to their location to obtain a simple path. According the method of the present application, a complex path can be simplified to a simplest path defining a region by utilizing node scanning process, such that operations on a vector level for a complex path can be realized.

15 Claims, 8 Drawing Sheets

(56) References Cited

U.S. PATENT DOCUMENTS

| | | | |
|---|---|---|---|
| 5,471,568 A * | 11/1995 | Webb et al. | 382/199 |
| 5,818,460 A * | 10/1998 | Covey et al. | 345/443 |
| 6,111,587 A * | 8/2000 | Covey et al. | 345/629 |
| 6,285,375 B1 * | 9/2001 | John, Jr. | 345/440 |
| 6,628,281 B1 * | 9/2003 | Fossum et al. | 345/422 |
| 7,250,946 B1 | 7/2007 | Moreton | |
| 7,426,455 B1 * | 9/2008 | Antony | 703/2 |
| 8,274,514 B1 * | 9/2012 | Martino | 345/442 |
| 8,471,855 B2 * | 6/2013 | Higuchi et al. | 345/443 |
| 2002/0085005 A1 * | 7/2002 | Becker et al. | 345/443 |
| 2003/0085887 A1 | 5/2003 | Hunt et al. | |
| 2004/0145587 A1 * | 7/2004 | Morikawa | 345/441 |
| 2007/0229510 A1 * | 10/2007 | Rey | 345/443 |
| 2007/0236499 A1 * | 10/2007 | Mihara et al. | 345/441 |

* cited by examiner

METHOD AND DEVICE FOR SIMPLIFYING A COMPLEX PATH

RELATED APPLICATIONS

The present application is national phase of PCT/CN2009/074292 filed Sep. 28, 2009, and claims priority from, Chinese Application No. 200810223289.8 filed Sep. 28,2008.

FIELD OF THE INVENTION

The invention relates to the technical field of graphic image processing, especially to a technology for simplifying a complex path.

BACKGROUND OF THE INVENTION

In graphic image processing techniques, a path refers to a vector linked-list consisted of linked straight-line vectors and curve vectors. A path in which the vector linked-list is connected end-to-end is referred to as a closed path. A closed path is generally employed to describe a particular region which can be referred to as a graphics element. For example, if a graphics element needs to be filled in with a color, a closed path which is the boundary of a region to be filled in is used to describe the graphics element. Or, if a graphics element needs to be cut out, a closed path which is the boundary of a region to be cut out is also used to describe the graphics element. However, in prior art, a path is described according to the order of appearance of vectors, without considering positional relations of various vectors in the path. Therefore, self-intersection generally exists in the obtained path. A closed path with self-intersection is not the simplest path for describing a region, because superfluous vector description may exist, i.e. some of the vectors constituting the closed path are not located on the boundary of the region described by the closed path, but located inside the region. A path with self-intersection is referred to as a complex path. FIG. 1 is a schematic diagram of a complex path which consists of five straight-line vectors T0, T1, T2, T3, T4 connected end-to-end. A complex path will cause great inconvenience to path computation on a vector level. Correspondingly, a closed path in which each vector constituting the closed path is located on the boundary of the region described by the closed path is referred to as a simple path, which is the simplest path for defining the region.

In current graphic image processing techniques, a mechanism of rasterization bitmap processing is employed to determine a region described by a complex path. For example, two paths (a first path and a second path) for describing a region to be cut out superimpose each other, and a closed path formed after the superimposition is a complex path. The region to be cut out which is described by the complex path should be the intersection of respective regions described by the two paths, and is determined in the following manner. First of all, algorithms relating to Graphics are used to convert a first path to a black and white bitmap, in which a black point indicates that the point is within the described region and a white point indicates that the point is outside the described region. Similarly, a second path is converted to another black and white bitmap. Then the intersection of the two bitmaps is evaluated, i.e. only when both points in the same position are black points, the point can be determined as a block point, and thereby the region to be cut out is finally determined. Of course, it is also possible to evaluate the union of the two black and white bitmaps according to actual demands and thus finally determine the region to be cut out.

However, in the course of some graphic image processing, it is required that a particular region is still described by vectors, rather than rasterised bitmaps, after processing a complex path. For example, a trap process adopts various graphics elements to describe objects required to display in a PDF file, and it needs to fill a particular color in an intersecting position of two graphics elements to obtain trapping effects. The intersecting position also needs to be provided in a manner of graphics elements in PDF files. Therefore, it is required to perform operations on a vector level on closed paths describing the two graphics elements, to acquire vector description of the intersecting position. Employing algorithms relating to Computational Geometry can perform operations on a vector level on closed paths, on the premise that the closed paths on which operations are performed are simple paths, while a complex path with self-intersection can not be processed. However, during actual graphic image processing, degrees of freedom of a closed path for describing a graphics element are very high and the closed path is usually a complex path. Therefore, there is a pressing need for a solution which can simplify any complex path to a simple path of a region described by the complex path.

SUMMARY OF THE INVENTION

The present invention provides a method and device for simplifying a complex path, to accomplish simplification of any complex path into a simple path of a region described by the complex path.

An aspect of the present invention is a method for simplifying a complex path, which comprises:

parsing the complex path into a vector linked-list consisted of linked monotonic vectors;

dividing each vector in the vector linked-list into vector segments according to intersection points of the vector with other vectors in the vector linked-list; and extracting from all vector segments the vector segments located on a boundary of a region defined by the complex path, and connecting the extracted vector segments according to their location to obtain a simple path.

An aspect of the present invention is a device for simplifying a complex path, which comprises:

parsing unit, configured to parse a complex path into a vector linked-list consisted of linked monotonic vectors;

dividing unit, configured to divide each vector into vector segments according to intersection points of each vector with other vectors in the vector linked-list; and processing unit, configured to extract vector segments located on a boundary of a region defined by the complex path from all the vector segments, and connect the extracted vector segments according to their location to obtain a simple path.

According to the method and device for simplifying a complex path of the present invention, a complex path is parsed into a vector linked-list consisted of linked monotonic vectors, each vector is divided into vector segments according to intersection points of the vector with other vectors, vector segments located on a boundary of a region described by the complex path are extracted from all vector segments, and the extracted vector segments are connected so as to obtain a simple path. According to the present invention, a mode of node scanning is utilized to accomplish on a vector level simplification of a complex path into the simplest path of a region described by the complex path, so as to realize operations of a complex path on a vector level.

DESCRIPTION OF THE PREFERRED EMBODIMENTS

Figure 2:
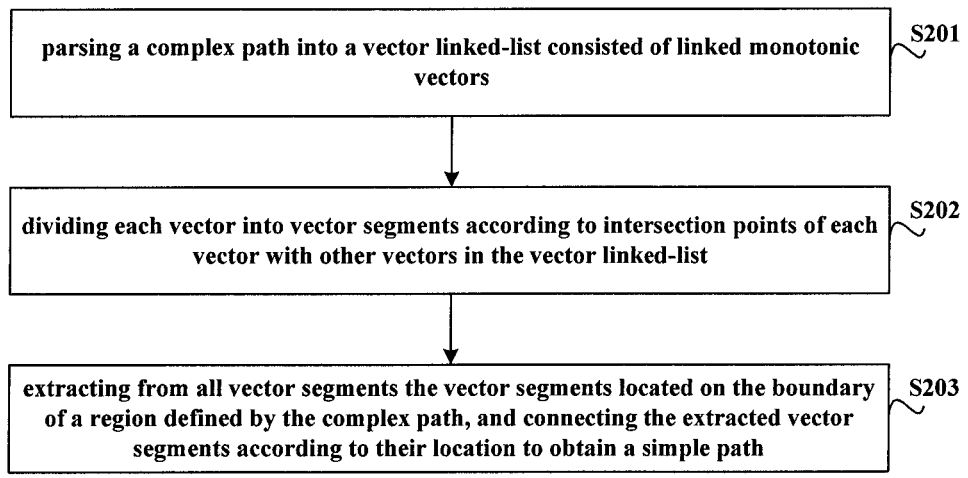
FIG. 2 is a flow chart of a method for simplifying a complex path according to an embodiment of the present application.

In the light of problems present in prior art, the present application provides a method for simplifying a complex path. According the method of the present application, a complex path can be simplified to a simple path defining a region by utilizing node scanning process, such that operations on a vector level for a complex path can be realized. As shown in FIG. 2, a method for simplifying a complex path according to an embodiment of the present invention comprises the following steps:

S201, parsing a complex path into a vector linked-list consisted of linked monotonic vectors;

S202, dividing each vector into vector segments according to intersection points of each vector with other vectors in the vector linked-list, in which the obtained vector segments do not intersect and are only connected by endpoints of the vector segments; and S203, extracting from all vector segments the vector segments located on the boundary of a region defined by the complex path, and connecting the extracted vector segments according to their location to obtain a simple path.

Figure 3:
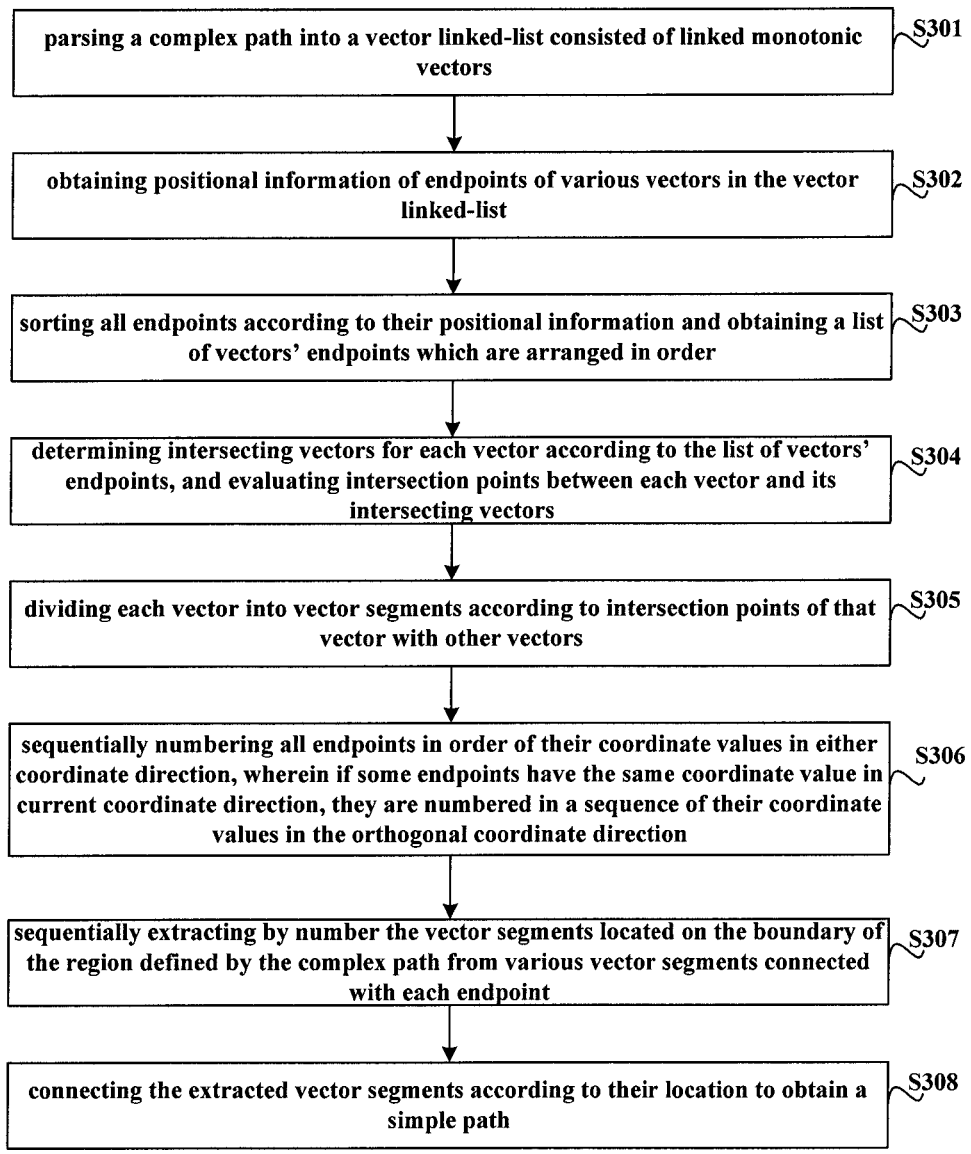
FIG. 3 is another flow chart of a method for simplifying a complex path according to an embodiment of the present application.

In the following description, numerous specific details of a method for simplifying a complex path according to an embodiment are set forth. As shown in FIG. 3, a detailed processing flow for simplifying a complex path comprises the following steps.

At step S301, a complex path is parsed into a vector linked-list consisted of linked monotonic vectors.

As known, a straight-line vector must be a monotonic vector, whereas a curve vector may not possess monotonicity. A curve vector without monotonicity must have extreme points or inflection points, or both. The non-monotonic curve vectors need to be resolved at extreme points or inflection points, to ensure that curve segments within the vector linked-list are monotonic, i.e. there are no inflection points in the curve segment and both endpoints of the curve segment are extreme points of the vector.

At step S302, positional information of endpoints of various vectors in the vector linked-list is obtained. The positional information of endpoints includes coordinate values of endpoints in two mutually orthogonal coordinate directions, i.e. coordinate values in X-axis and Y-axis directions, and endpoints' relative positions in the vector.

In both endpoints of a vector, the one with the smaller X-axis coordinate value may be determined as the left endpoint, and the other with the larger X-axis coordinate value may be determined as the right endpoint. If both endpoints have equal X-axis coordinate values, the one with the larger Y-axis coordinate value may be identified as the left endpoint. The left endpoint and the right endpoint can mark endpoints' relative positions in the vector.

At step S303, all endpoints are sorted according to their positional information and thereby a list of vectors' endpoints which are arranged in order is obtained.

All endpoints may be sorted according to their X-axis coordinate values, generally in accordance with the order from small to large X-axis coordinate values. For respective endpoints with identical X-axis coordinate value, they are sequenced in order of the left endpoint being in front of the right endpoint.

Further, for respective endpoints with equal X-axis coordinate value and simultaneously being the left endpoints or the right endpoints, these endpoints are sorted according to the sequence of appearance of vectors that these endpoints belong to.

At step S304, intersecting vectors for each vector are determined according to the list of vectors' endpoints, and intersection point(s) between each vector and its intersecting vectors are evaluated.

In the list of vectors' endpoints, if the left endpoint of one vector is between the left endpoint and the right endpoint of another vector, the two vectors overlap each other in the X-axis direction. Further, if the two vectors also overlap each other in the Y-axis direction, then they are determined as intersected vectors. Intersection points are identified for all vector pairs being determined as intersected vectors. Methods for identifying may include, in accordance with actual situations, calculation methods for evaluating intersection points between straight-line vectors, between a straight-line vector and a curve vector or between curve vectors.

At step S305, each vector is divided into vector segments according to intersection points of that vector with other vectors.

According the intersection points, each straight-line vector may be segmented into a number of straight-line vector segments and each curve vector may be segmented into multiple curve vector segments. If there are N intersection points on a vector, the vector can be segmented into N+1 vector segments according these N points, each vector segment having only two endpoints. If there is no intersection point on a vector (that is to say, there is zero intersection point), a segment obtained after the dividing step is the vector itself. All vector segments obtained after dividing form the most basic vectorial description for the complex path. The vector segments connect with each other only at their endpoints, no intersection points existing among the vector segments.

At step S306, all endpoints are numbered sequentially in order of their coordinate values in either coordinate direction (X-axis direction or Y-axis direction). If some endpoints have the same coordinate value in current coordinate direction, they are numbered in a sequence of their coordinate values in the orthogonal coordinate direction (Y-axis direction or X-axis direction).

Taking the X-axis direction as an example, all endpoints may be numbered in order of their coordinate values in the X-axis direction. For those endpoints with equal coordinate value in the X-axis direction, they are numbered in a sequence of their coordinate values in the Y-axis direction. The endpoints may be numbered in accordance with the order from large to small coordinate values or the order from small to large coordinate values.

At step S307, vector segments located on the boundary of the region defined by the complex path are extracted sequentially by number from various vector segments connected with each endpoint, wherein the extracted vector segments may be referred to as boundary vector segments.

An exemplary method for determining boundary vector segments comprises: determining between both lateral regions divided by a vector segment whether one lateral region is an inner portion inside the region defined by the complex path and the other lateral region is a outer portion outside the region defined by the complex path; if YES, the vector segment is determined as a boundary vector segment, otherwise, the vector segment is determined as a non-boundary vector segment.

The above determination method is accomplished in accordance with a fill-rule. Vector segments correlated with present endpoints may be classified into three types. Taking endpoints numbered in order of their coordinate values in the X-axis direction as an example, endpoints with identical coordinate value in the X-axis direction may be referred to as endpoints of same column. Thus the three types of vector segments respectively are: type a, in which the terminal point of the vector segment is an endpoint in the present column; type b, in which the start point of the vector segment is an endpoint in the present column; type c, neither the terminal point nor the start point of the vector segment is within the present column. When determining boundary vector segments at each endpoint, these three types of vector segments associated with each endpoint would be taken as a basis.

At step S308, the extracted vector segments are linked according to their location so as to obtain the simple path.

The extracted vector segments may be linked according to location in the counterclockwise or clockwise direction so as to obtain the simple path of the region defined by the complex path.

According to the method for simplify a complex path of the present invention, a complex path can be simplified on a vector level into the simplest path of a region defined by the complex path. Meanwhile, because a sorted vector endpoint list is employed to determine whether two vectors intersect each other or not and to determine intersection points of the two intersecting vectors, a drawback that intersection evaluation is required for any two vectors is avoided and the computational efficiency is improved.

Figure 1:
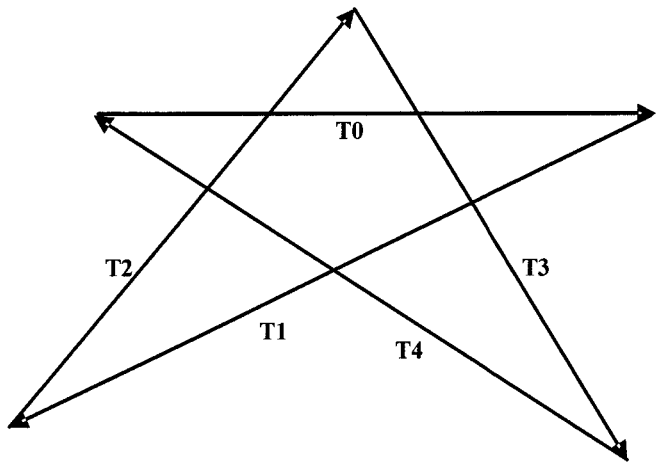
FIG. 1 is a schematic diagram of a complex path in prior art.

A scheme provided by embodiments of the invention will be further described in combination with specific examples below, illustrated by way of example for simplification of the complex path shown in FIG. 1. According to the processing flow of simplification of the complex path provided by embodiments of the invention, the following operations are performed in turn.

A complex path is parsed into a vector linked-list consisted of linked monotonic vectors. Because straight-line vectors have monotonicity, the vector linked-list obtained by parse is the complex path itself.

Figure 4:
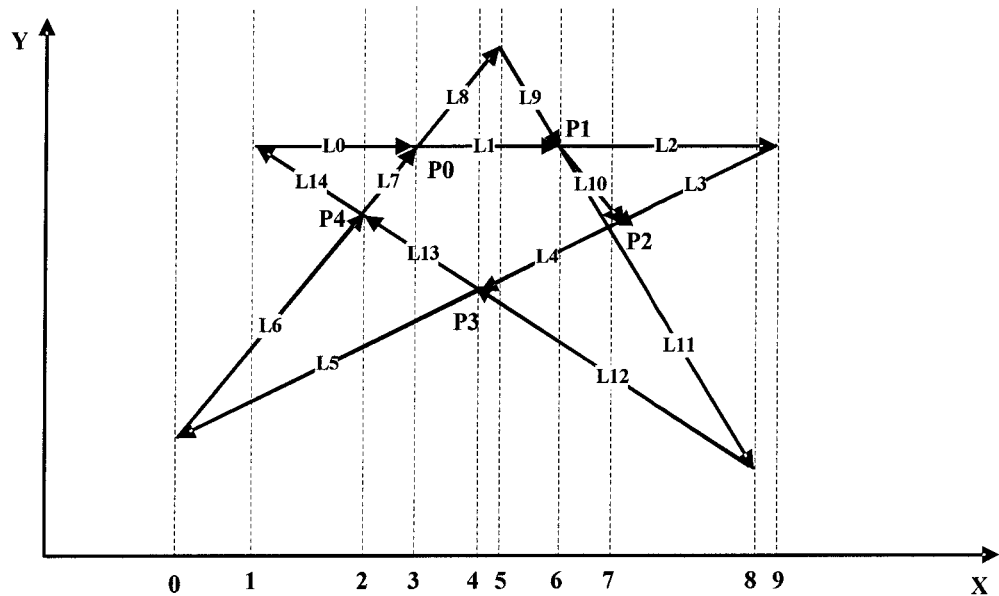
FIG. 4 is a processing schematic diagram of segmenting various vectors in a complex path shown in FIG. 1 based on intersection points according to an embodiment of the present application.

According to intersection points of each vector with other vectors in the vector linked-list, each vector is segmented into multiple vector segments. As shown in FIG. 4, intersection points among vectors in the vector linked-list are respectively P0, P1, P2, P3, and P4. Each vector is divided into vector segments in accordance to the intersection points, respectively as follows:

according to intersection points P0, P1 between T0 and other vectors, T0 is segmented into vector segments L0, L1, L2;

according to intersection points P2, P3 between T1 and other vectors, T1 is segmented into vector segments L3, L4, L5;

according to intersection points P4, P0 between T2 and other vectors, T2 is segmented into vector segments L6, L7, L8;

according to intersection points P1, P2 between T3 and other vectors, T3 is segmented into vector segments L9, L10, L11;

according to intersection points P3, P4 between T4 and other vectors, T4 is segmented into vector segments L12, L13, L14; and each endpoint is numbered in accordance with the order from small to large coordinate values in the X-axis direction, and ten endpoints numbered from 0 to 9 are obtained.

Boundary vector segments are extracted sequentially in order of number from the vector segments connected at each endpoint. During processing each endpoint, a linked-list of boundary vector segments can be generated, which falls into an upper sub-list UpList and a lower sub-list DownList, and the following is defined:

OldEdge: an old boundary vector segment connected with the present endpoint, i.e. the terminal point of this old boundary vector segment is the present endpoint;

NewEdge: a new boundary vector segment connected with the present endpoint, i.e. the start point of this new boundary vector segment is the present endpoint.

If two new boundary vector segments are to be connected, one new list of boundary vector segments is generated and an upper sub-list and a lower sub-list are respectively used to point at the two new boundary vector segments. If one new and one old boundary vector segments are to be connected, since the old boundary vector segment is already present in a list of boundary vector segments, the new boundary vector segment is added to the end of the old one. If two old boundary vector segments are to be connected, then if the two segments belong respectively to different lists of boundary vector segments, the two lists are merged, else if the two segments belong to the same list of boundary vector segments, then the list is closed. When connecting, if the endpoints of the two boundary vector segments at the present endpoint do not overlap, a new perpendicular boundary vector segment is created for connecting the two endpoints. When generating a simple path, if a counterclockwise vector description is needed, it starts from the head of the lower sub-list of the boundary vector segments list, then to the end of the lower sub-list, then connects to the end of the upper sub-list, and finally up to the head of the upper sub-list; while if a clockwise vector description is needed, the order is reverse.

Figure 5:
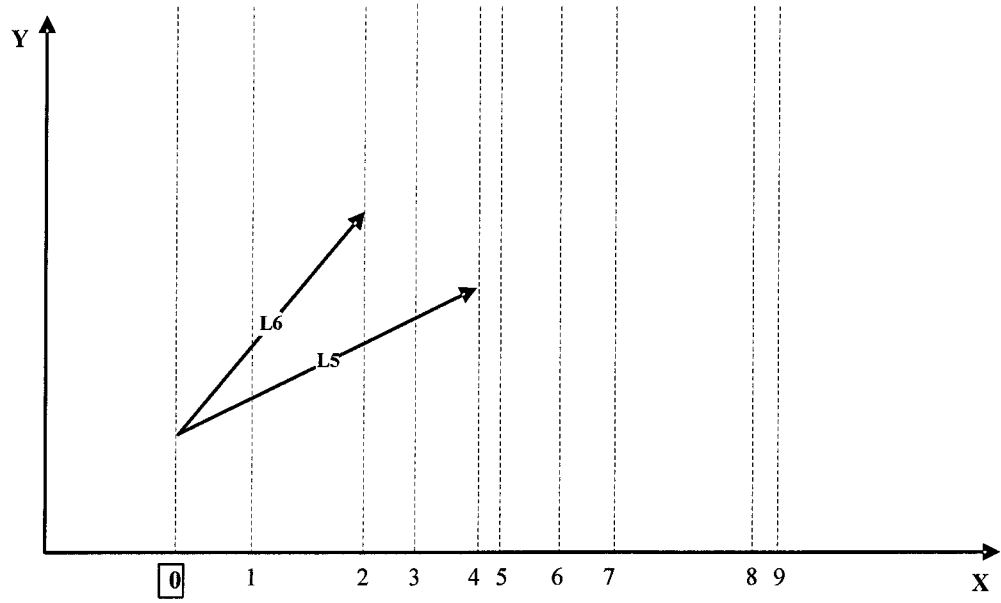
FIGS. 5-14 are respectively schematic diagrams of processing endpoints of FIG. 4 in numerical sequence according to an embodiment of the present application.

The following illustrates sequentially processing of respective endpoints by number in combination with Figures. Referring to FIGS. 5, L5 and L6 are extracted as boundary vector segments from all vector segments connected with endpoint 0. Therefore, the OldEdge is empty and the NewEdges are L5, L6. Then new boundary vector segment list PathEdgeList0 is created, whose upper and lower sub-lists are respectively:

PathEdgeList0->UpList: L6
PathEdgeList0->DownList: L5.

Figure 6:
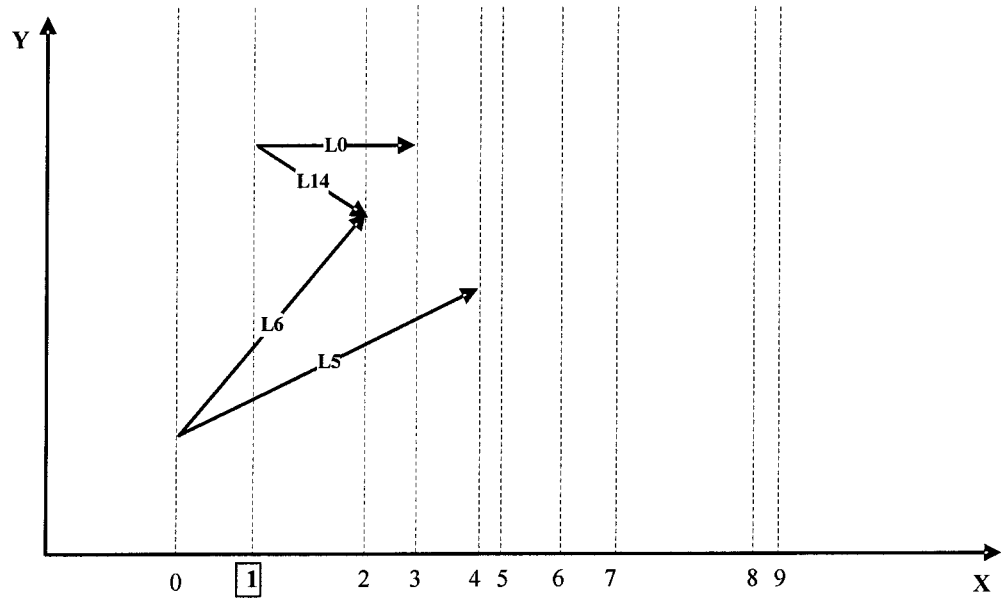

Referring to FIG. 6, L0 and L14 are extracted as boundary vector segments from all vector segments connected with endpoint 1. The OldEdge is empty and the NewEdges are L0, L14. Then new boundary vector segment list PathEdgeList1 is created, whose upper and lower sub-lists are respectively:

PathEdgeList1->UpList: L0
PathEdgeList1->DownList: L14.

Figure 7:
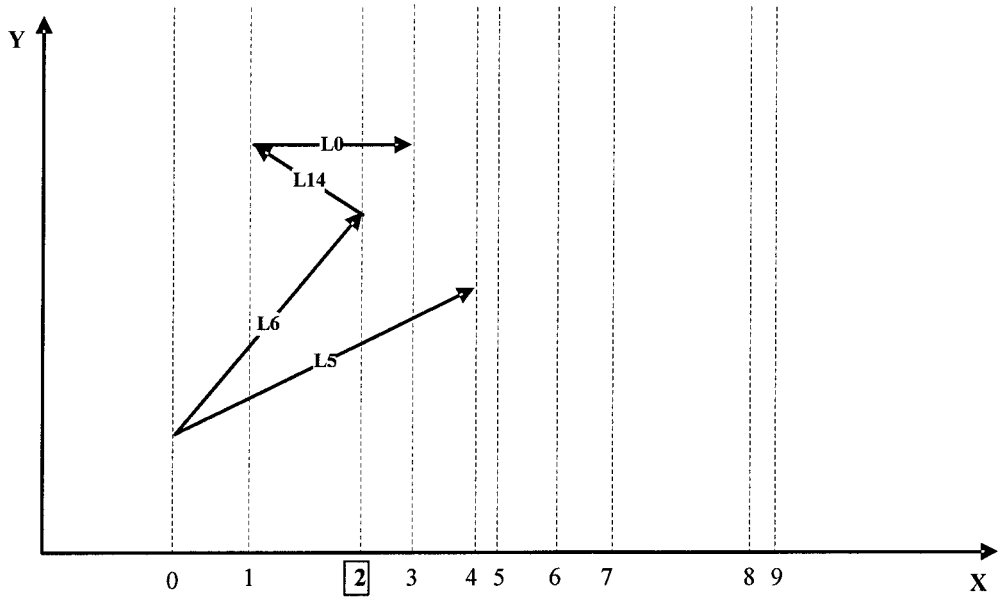

Referring to FIGS. 7, L14 and L6 are extracted as boundary vector segments from all vector segments connected with endpoint 2. The OldEdges are L14 and L6 and the NewEdge is empty. Then the boundary vector segment lists where L14 and L6 are located are merged, and upper and lower sub-lists of the merged boundary vector segment list are respectively:

PathEdgeList0->UpList: L6->L14->L0
PathEdgeList0->DownList: L5.

Figure 8:
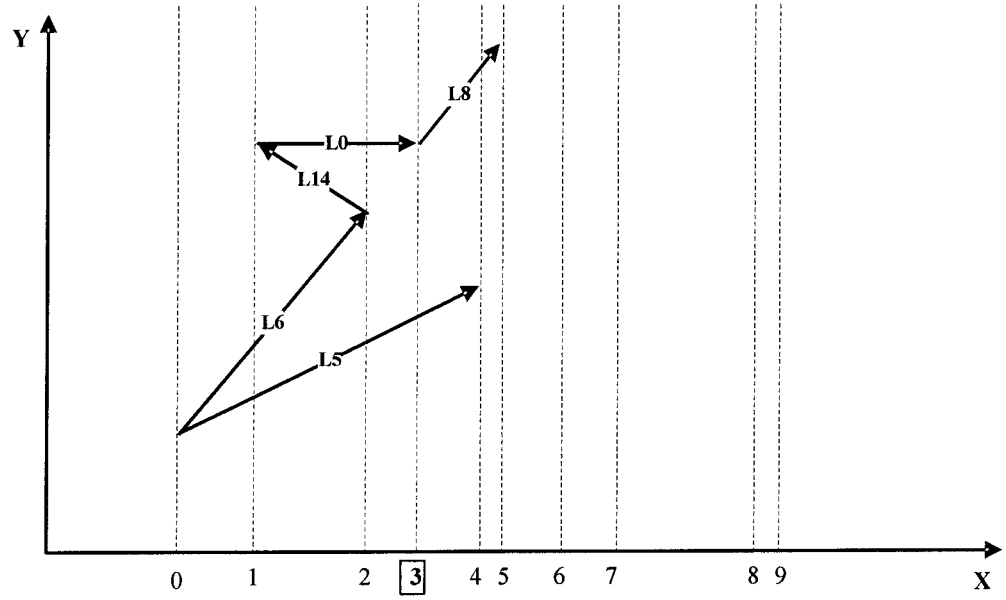

Referring to FIG. 8, L0 and L8 are extracted as boundary vector segments from all vector segments connected with endpoint 3. The OldEdge is L0 and the NewEdge is L8. Then L8 is added to the end of L0, and upper and lower sub-lists of the processed boundary vector segment list are respectively:

PathEdgeList0->UpList: L6->L14->L0->L8
PathEdgeList0->DownList: L5.

Figure 9:
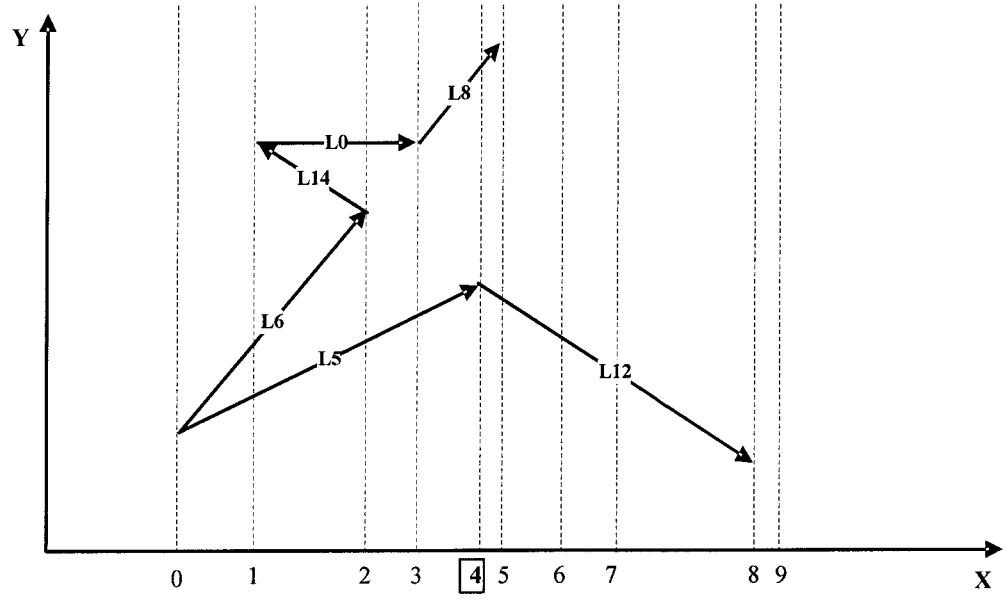

Referring to FIGS. 9, L5 and L12 are extracted as boundary vector segments from all vector segments connected with endpoint 4. The OldEdge is L5 and the NewEdge is L12. Then L12 is added to the end of L5, and upper and lower sub-lists of the processed boundary vector segment list are respectively:

PathEdgeList0->UpList: L6->L14->L0->L8
PathEdgeList0->DownList: L5->L12.

Figure 10:
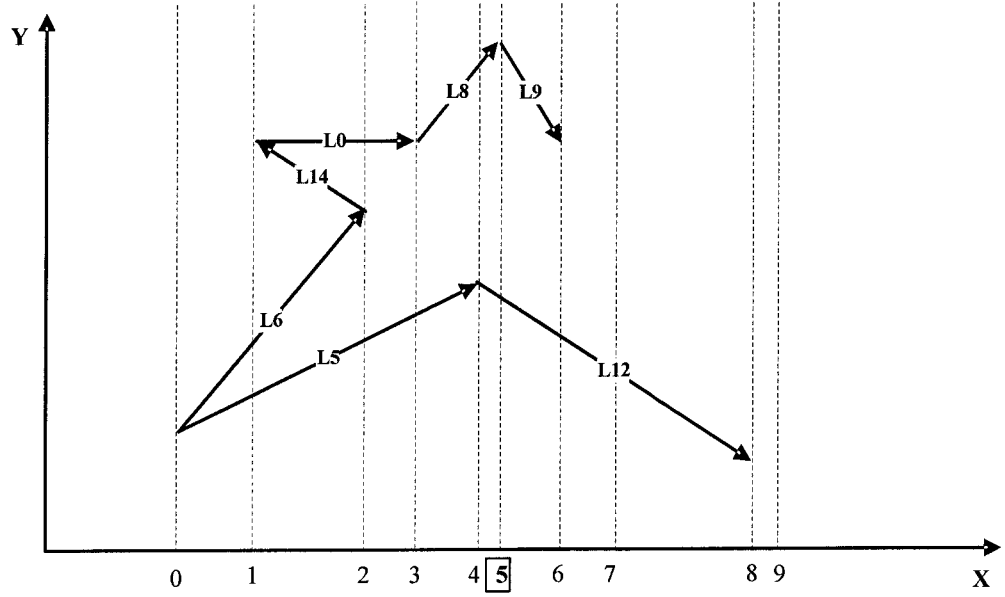

Referring to FIGS. 10, L8 and L9 are extracted as boundary vector segments from all vector segments connected with endpoint 5. The OldEdge is L8 and the NewEdge is L9. Then L9 is added to the end of L8, and upper and lower sub-lists of the processed boundary vector segment list are respectively:

PathEdgeList0->UpList: L6->L14->L0->L8->L9
PathEdgeList0->DownList: L5->L12.

Figure 11:
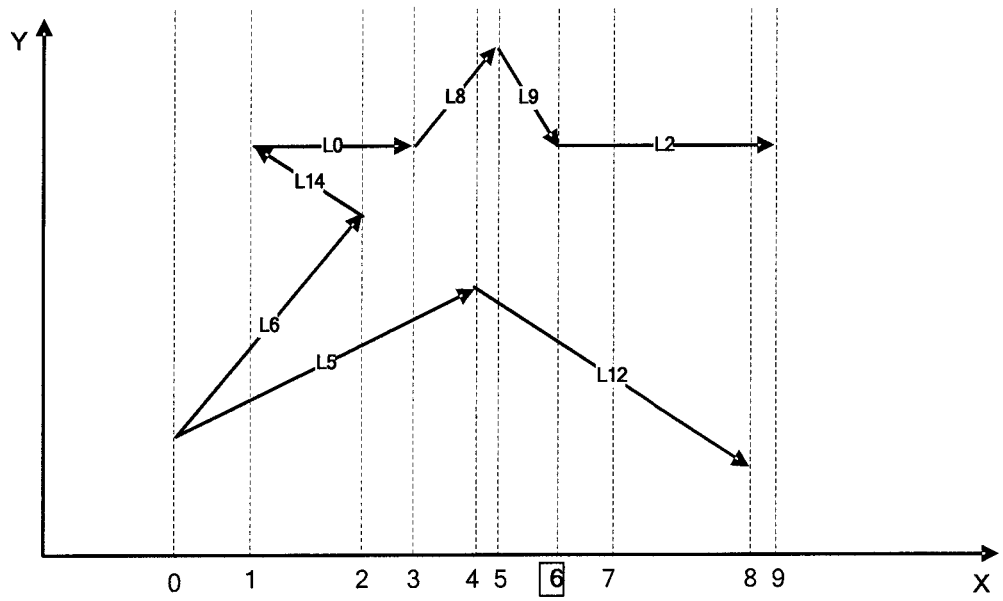

Referring to FIGS. 11, L9 and L2 are extracted as boundary vector segments from all vector segments connected with endpoint 6. The OldEdge is L9 and the NewEdge is L2. Then L2 is added to the end of L9, and upper and lower sub-lists of the processed boundary vector segment list are respectively:

PathEdgeList0->UpList: L6->L14->L0->L8->L9->L2
PathEdgeList0->DownList: L5->L12.

Figure 12:
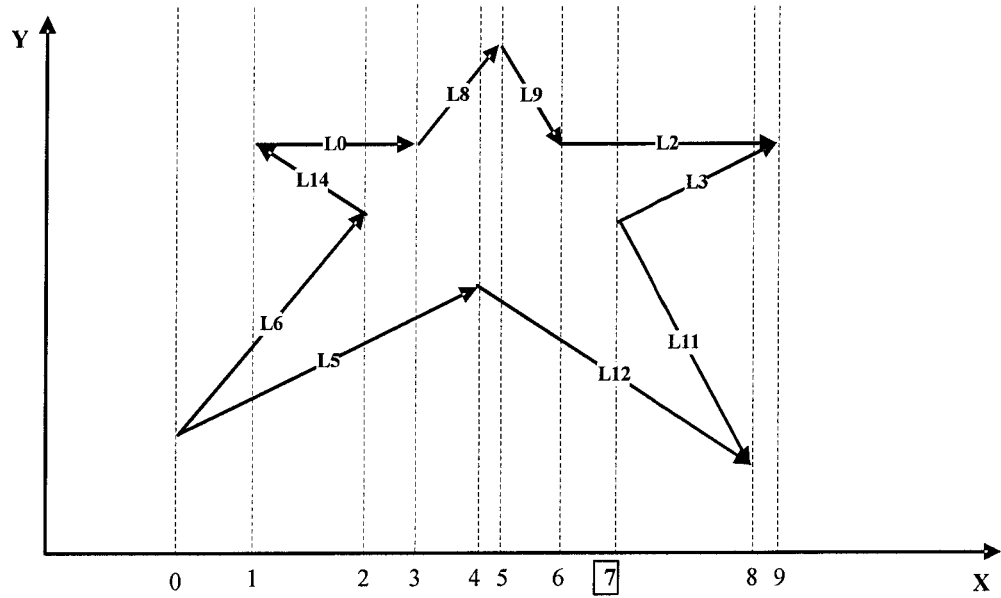

Referring to FIGS. 12, L3 and L11 are extracted as boundary vector segments from all vector segments connected with endpoint 7. The OldEdge is empty and the NewEdges are L3 and L11. Then new boundary vector segment list PathEdgeList1 is generated, whose upper and lower sub-lists are respectively:

PathEdgeList1->UpList: L3
PathEdgeList1->DownList: L11.

Figure 13:
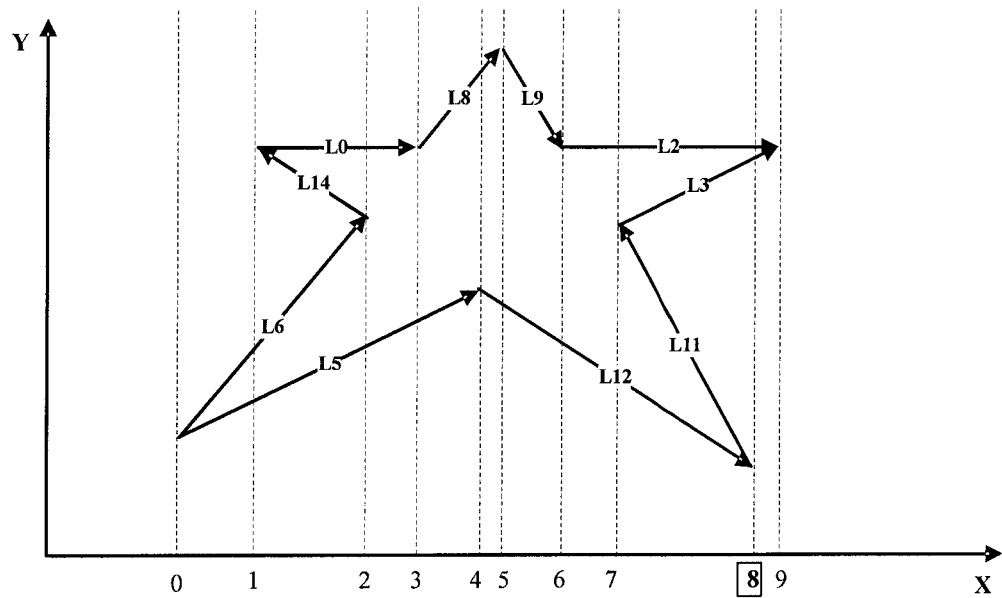

Referring to FIGS. 13, L11 and L12 are extracted as boundary vector segments from all vector segments connected with endpoint 8. The OldEdges are L11 and L12 and the NewEdge is empty. Then the boundary vector segment lists where L11 and L12 are located are merged, upper and lower sub-lists of the merged boundary vector segment list are respectively:

PathEdgeList0->UpList: L6->L14->L0->L8->L9->L2
PathEdgeList0->DownList: L5->L12->L11->L3.

Figure 14:
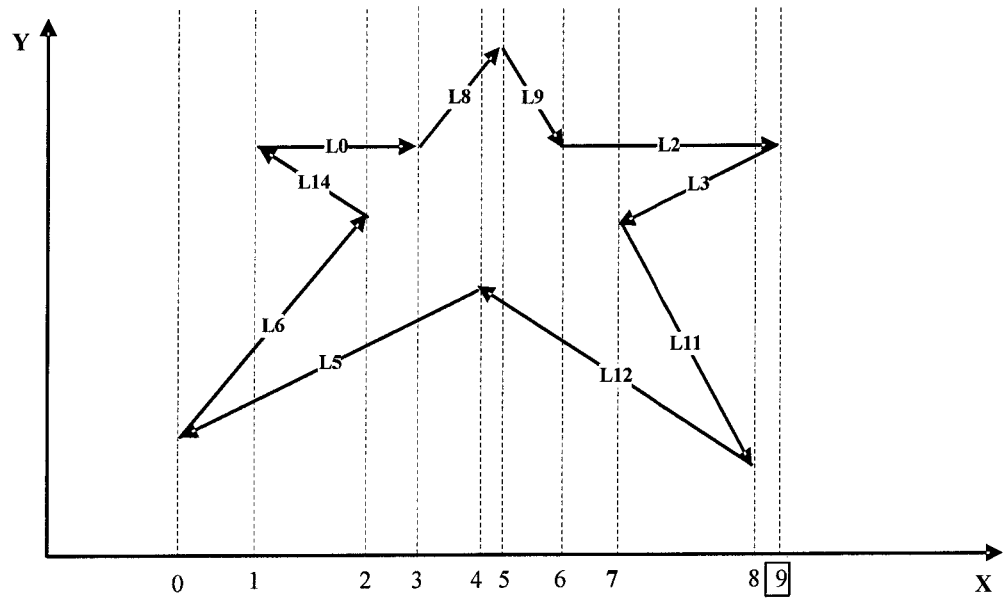

Referring to FIGS. 14, L2 and L3 are extracted as boundary vector segments from all vector segments connected with endpoint 9. The OldEdges are L2 and L3 and the NewEdge is empty. Then the boundary vector segment lists where L2 and L3 are located are merged. Because L2 and L3 belong to the same boundary vector segment list, the list is closed. If a counterclockwise vector description is needed, the upper sub-list is merged to the lower sub-list and the simple path finally obtained is:

L5->L12->L11->L3->L2->L9->L8->L0->L14->L6.

If a clockwise vector description is needed, then the lower sub-list is merged to the upper sub-list and the simple path finally obtained is:

L6->L14->L0->L8->L9->L2->L3->L11->L12->L5.

Preferably, if each endpoint is numbered sequentially in accordance with the order from small to large coordinate values in the X-axis direction, boundary vector segments may be extracted from various vector segments connected with the right side of each endpoint, and thus simplification efficiency is further improved.

Figure 15:
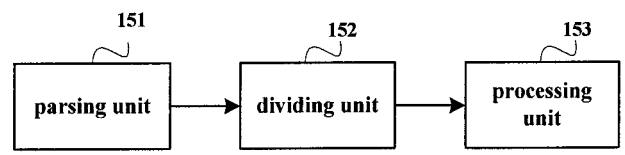
FIG. 15 is a block diagram of a device for simplifying a complex path according to an embodiment of the present application.

In accordance with the same technical conception, embodiments of the invention provide a device for simplifying a complex path, as shown in FIG. 15, which comprises:

parsing unit 151, configured to parse a complex path into a vector linked-list consisted of linked monotonic vectors;

dividing unit 152, configured to divide each vector into vector segments according to intersection points of each vector with other vectors in the vector linked-list;

processing unit 153, configured to extract from all vector segments the vector segments located on the boundary of a region defined by the complex path, and connect the extracted vector segments according to their location to obtain a simple path.

It will be apparent to those of ordinary skill in the art that various modifications and changes can be made to the invention without departing from the spirit and scope of the invention. Therefore, it is intended that the invention contains such modifications and changes if they fall in the scope of the appended claims and equivalents thereof.

The invention claimed is:

1. A computer-implemented method for simplifying a complex path, the complex path comprises a plurality of vectors with self-intersection therebetween, the method comprising:

parsing, by a cumputer, the complex path into a vector linked-list of linked monotonic vectors;

dividing, by the cumputer, each vector in the vector linked-list into vector segments according to intersection points of the vector with other vectors in the vector linked-list; and extracting, by the cumputer and from all vector segments, the vector segments located on a boundary of a region defined by the complex path, and connecting the extracted vector segments according to their locations to obtain a simple path, wherein the extracting includes:

sequentially numbering all endpoints in order of their coordinate values in a first coordinate direction, and if there are endpoints with the same coordinate value in the first coordinate direction, numbering the endpoints with the same coordinate value in order of their coordinate values in a second coordinate direction orthogonal to the first coordinate direction; and sequentially extracting by number the vector segments located on the boundary of the region defined by the complex path from vector segments connected with each endpoint.

2. The method according to claim 1, wherein the monotonic vectors include straight-line vectors and/or monotonic curve vectors.

3. The method according to claim 2, further comprising:

determining, by the cumputer, intersection points of each vector with other vectors in the vector linked-list, wherein the determining includes:

obtaining positional information of endpoints of the vectors in the vector linked-list;

sorting all the endpoints according to their positional information and obtaining a list of vectors' endpoints which are arranged in order; and determining intersecting vectors for each vector according to the list of vectors' endpoints, and evaluating intersection points between each vector and its intersecting vectors.

4. The method according to claim 3, wherein the positional information of the endpoints includes coordinate values of the endpoints in the first and second orthogonal coordinate directions and the endpoints' relative position in a vector; and the sorting all the endpoints according to their positional information includes:

sorting all the endpoints according to their coordinate values in one of the first and second coordinate directions; and if there are endpoints with the same coordinate value in the one coordinate direction, sorting the endpoints with the same coordinate value according to their relative position in the vector.

5. The method according to claim 4, wherein the sorting all the endpoints according to their positional information further includes:

if there are endpoints with the same coordinate value and same relative position in vectors, sorting the endpoints with the same coordinate value and same relative position according to the sequence of appearance of vectors to which the endpoints belong.

6. The method according to claim 5, wherein the first coordinate direction is the X-axis coordinate direction.

7. The method according to claim 6, wherein the vector segments located on the boundary of the region defined by the complex path are extracted from vector segments connected with a right side of each endpoint.

8. The method according to claim 5, further comprising:

determining, by the cumputer, whether a vector segment is located on the boundary of the region or not, wherein the determining includes:

determining between two regions divided by the vector segment whether one of the two regions is an inner portion inside the region defined by the complex path and the other of the two regions is an outer portion outside the region defined by the complex path; if yes, the vector segment is determined to be located on the boundary of the region defined by the complex path.

9. The method according to claim 1, further comprising:

determining, by the cumputer, intersection points of each vector with other vectors in the vector linked-list, wherein the determining includes:

obtaining positional information of endpoints of the vectors in the vector linked-list;

sorting all the endpoints according to their positional information and obtaining a list of vectors' endpoints which are arranged in order; and determining intersecting vectors for each vector according to the list of vectors' endpoints, and evaluating intersection points between each vector and its intersecting vectors.

10. The method according to claim 3, wherein the positional information of the endpoints includes coordinate values of the endpoints in the first and second coordinate directions and the endpoints' relative position in a vector; and the sorting all the endpoints according to their positional information includes:

sorting all the endpoints according to their coordinate values in one of the first and second coordinate directions; and if there are endpoints with the same coordinate value in the one coordinate direction, sorting the endpoints with the same coordinate value according to their relative position in the vector.

11. The method according to claim 10, wherein the sorting all the endpoints according to their positional information further includes:

if there are endpoints with the same coordinate value and same relative position in vectors, sorting the endpoints with the same coordinate value and same relative position according to the sequence of appearance of vectors to which the endpoints belong.

12. The method according to claim 1, wherein the first coordinate direction is the X-axis coordinate direction.

13. The method according to claim 12, wherein the vector segments located on the boundary of the region defined by the complex path are extracted from vector segments connected with a right side of each endpoint.

14. The method according to claim 1, further comprising:

determining, by the cumputer, whether a vector segment is located on the boundary of the region or not, wherein the determining includes:

determining between two regions divided by the vector segment whether one of the two regions is an inner portion inside the region defined by the complex path and the other of the two regions is an outer portion outside the region defined by the complex path; and if yes, the vector segment is determined to be located on the boundary of the region defined by the complex path.

15. A device for simplifying a complex path, comprising:

parsing unit, configured to parse a complex path into a vector linked-list of linked monotonic vectors;

dividing unit, configured to divide each vector in the vector linked-list into vector segments according to intersection points of the vector with other vectors in the vector linked-list; and a processing unit, configured to extract vector segments located on a boundary of a region defined by the complex path from all the vector segments, and connect the extracted vector segments according to their locations to obtain a simple path, wherein the processing unit is configured to exact the vector segments by:

sequentially numbering all endpoints in order of their coordinate values in a first coordinate direction, and if there are endpoints with the same coordinate value in the first coordinate direction, numbering the endpoints with the same coordinate value in order of their coordinate values in a second coordinate direction orthogonal to the first coordinate direction; and sequentially extracting by number the vector segments located on the boundary of the region defined by the complex path from vector segments connected with each endpoint.

* * * * *